Patented Apr. 7, 1953

2,634,193

UNITED STATES PATENT OFFICE 2,634,193

METHOD OF MAKING IRON OXIDE PIGMENTS

George E. Noponen, White Bear, Minn., assignor to Minnesota Mining & Manufacturing Company, St. Paul, Minn., a corporation of Delaware No Drawing. Application December 19, 1947, Serial No. 792,867

5 Claims. (Cl. 23—200)

This invention relates to the manufacture of iron oxide, particularly for use as a pigment, for use as a rouge for polishing glass, and for other uses.

This application is a continuation-in-part of my copending application Serial No. 449,025, filed June 29, 1942, now abandoned.

The principal object of the invention is the production of iron oxide pigments of high quality, particularly having a high tinting strength and high chroma mass tone. The invention has particular utility in improving the iron oxide products obtained in methods in which substantial portions of the iron content of iron ore (including naturally occurring ore, pyrites cinder and such like) are converted to ferric sulfate and then calcined to produce the desired iron oxide, as well as in the production of iron oxide pigments from copperas.

In calcining iron sulfate to produce a red iron oxide pigment, the iron sulfate is customarily calcined for an hour or more at temperatures of approximately 1100° F. to aproximately 1800° F. in a roasting furnace either of the rotary type, continuous belt, semi-muffle type, closed muffle type or reverberatory type. In any of these roasting furnaces, and in view of the relatively high temperatures employed, it is unavoidably customary in commercial practices, if the sulfate is substantially completely decomposed, to overburn the iron oxide, with the result that the iron oxide produced contains considerable amounts of material of poor pigment quality in that it has a low tinting strength and low chroma mass tone. The sinters produced in the customary commercial practice, which do yield some iron oxide of pigment qualities, contain undecomposed iron sulfate and accordingly must be washed to remove the iron sulfate and dried before the material can be employed as a pigment. An important object of the present invention is the development of a calcining method in which the iron sulfate is substantially completely decomposed without overburning the iron oxide in commercial scale operations, and accordingly the calcined product need not be washed and dried as is customary in the commercial practices known to the art. A further object of the invention is the reduction of the fuel costs in the calcination of iron sulfate. A further important object of the invention is the development of a commercial calcining method that produces a neutral or sulfate-free sinter with a minimum of heat input, whereby pigments of maximum brightness and maximum chroma are produced. Increasing the rate of calcination is another object of my invention.

An important feature of the invention, when employed for calcining copperas ($FeSO_4 \cdot 7H_2O$), lies in the reduction both in the time and cost of calcination. In the commercial calcination of copperas, it is customary to first dry the material, before it is roasted to produce the iron oxide pigment, since it has been found that if the copperas is not first dried under controlled conditions, hard and glassy rings are formed in the kiln. I have found in practicing my invention on copperas that such rings are not formed, even though the material is not first subjected to the customary drying step.

A further important feature of the invention is the fact that the gas evolved in the calcination of iron sulfates to iron oxides, in accordance with my improvement, contains a higher ratio of sulphur dioxide ($SO_2$) to sulphur trioxide ($SO_3$) than is obtained in calcining iron sulfate according to the methods known to the art. (In the absence of atmospheric oxygen, the gas evolved contains substantially no $SO_3$. The unavoidable presence of air, in any commercial calcining operation, in contact with the bed of material being calcined, necessarily results in re-oxidation of a small portion of the $SO_2$ to $SO_3$. The amount of the latter, however, is kept to a minimum in my improved process.) This feature is of particular importance when the recovery of sulphur gases as sulphuric acid is contemplated, since in the contact sulphuric acid process the sulphur dioxide must be freed of sulphur trioxide before it is suitable for the acid recovery plant.

The two most common iron sulfates are ferrous sulfate ($FeSO_4$) and ferric sulfate ($Fe_2(SO_4)_3$). In calcining ferrous sulfate and ferric sulfate, the following reactions occur:

For ferrous sulfate—

$$6FeSO_4 \rightarrow 3Fe_2O_3 + 3SO_2 + 3SO_3$$

For ferric sulfate—

$$Fe_2(SO_4)_3 \rightarrow Fe_2O_3 + 3SO_3$$

Both of the above reactions are endothermic and require a constant supply of heat to continue. In the commercial calcination of iron sulfate, it has been found to be practically impossible to supply the amount of external heat required to complete these reactions without overburning the iron oxide ($Fe_2O_3$) formed in the early stages of the decomposition of the iron sulfate. Iron oxide has poor heat conductivity and its gradual formation in the sulfate sinter as the calcination progresses requires high temperatures and prolonged periods of heating to satisfy the heat requirements of the above reactions.

I have found that an exothermic reaction, which serves to promote the foregoing reactions and to accomplish the aforementioned objects, can be carried out simultaneously with the above reactions in the iron sulfate mass by having present in the mass a stoichiometric amount of a reagent such as carbon in one or more of its various forms. It has been found that carbon reacts with the sulphur trioxide, formed upon decomposition of iron sulfate, and gives off considerable quantities of heat due to the exothermic nature of the reaction, and thus the requirements of external heat and the time of calcination are materially reduced. The addition of carbon to the iron sulfate mass prior to calcination, produces the following reaction when the mass is heated during calcination:

$$2SO_3 + C \rightarrow 2SO_2 + CO_2$$

This reaction is exothermic and supplies an additional and internal source of heat adapted to aid in carrying the above decomposition reactions of ferrous sulfate and ferric sulfate substantially to completion. A further important advantage of my improved method of calcining iron sulfate is the fact that the heat given off by the reaction between carbon and sulphur trioxide is supplied at a time when it is needed to decompose the remaining iron sulfate and since the heat is supplied within the sinter, it thus promotes the decomposition of the iron sulfate to ferric oxide without the necessity of heating excessively the poorly conductive iron oxide first formed. Thus less external heat is required to carry out the calcination, and the overburning of ferric oxide, which is common in customary commercial calcination of iron sulfate and tends to produce considerable quantities of iron oxide of a poor pigment quality, is eliminated.

The improved method may be employed in calcining in any of the well-known types of roasting furnaces, such as those previously described. The carbon is added in finely divided form and may comprise powdered coal, powdered coke, carbon black, starch, molasses, sugar, charcoal, sawdust and the like, and since most of these materials are relatively inexpensive, a reduction in the total materials cost of calcination is obtained due to the lower fuel costs resulting from my improvement.

I have found that the addition of carbon in stoichiometric amounts based on the sulfate content of the iron sulfate starting material, in accordance with the chemical reaction hereinbefore indicated, provides for the burning of the iron sulfate in commercial operations to a neutral or sulfate-free, but not overburned, sinter. For example, one pound of powdered coal or coke, or other forms of carbon, is added to 100 pounds of copperas ($FeSO_4 \cdot 7H_2O$). In calcining copperas, the carbon is added to and well mixed, as by tumbling, with the granular iron sulfate before the external heat of calcination is applied.

In calcining ferric sulfate produced by converting iron ore, the carbonaceous material, in finely divided form, is preferably added to and thoroughly mixed with the ground iron ore prior to its conversion to ferric sulfate, although if desired, it may be mixed with the granular ferric sulfate after conversion. Approximately 4.5 pounds of carbon is added to the ore for each 100 pounds of ferric sulfate ($Fe_2(SO_4)_3$) to be produced in the conversion. The employment of carbon in excess of the stoichiometric proportions is to be avoided, since the excess carbon will act as a reducing agent on the iron oxide ($Fe_2O_3$) formed. On the other hand, a deficiency in the amount of carbon requires either that the mixture be incompletely burned, thus leaving an acid sinter which must be washed, or that portions of the mixture be overburned in order to make certain of the complete conversion of iron sulfate to iron oxide.

Acidity of the pigment product is determined by titrating a water extract of a sample with a standard alkali and expressing the result as percent $H_2SO_4$. My product can easily be controlled within an acidity of about 1 percent and can ordinarily be controlled within an acidity of less than ½ of 1 percent. Pigments of such low acidity are regarded as "neutral," as herein discussed; and such low acidity is of no real consequence in respect to wide spread commercial uses of my pigment product, such as in paints, ceramic coatings, floor tile, etc.

As an example of the utility of my improvement, it may be considered in connection with a method of producing red iron oxide pigments from iron ore as a starting material, in which upwardly of approximately 70% of the iron content of the ore is first converted to ferric sulfate to produce subsequently a pigment of high quality. One example of such a method comprises mixing 200 lbs. of ground iron ore and approximately 16.5 lbs. of carbon with approximately 280 lbs. of concentrated sulphuric acid of 96% $H_2SO_4$ content in an insulated internal mixer. Approximately 150 lbs. of water are then added and the reaction between the iron oxide and sulphuric acid is started by the heat of dilution of the acid and carried on by the heat given off by the exothermic reaction until approximately 80% of the iron of the ore is converted to ferric sulfate. Then the viscous fluid mixture is discharged into a suitable container where it solidifies to a granular form which can be conveniently handled during the roasting process, or, more preferably, the mobile but viscous mixture (with the stoichiometric proportion of carbon present) is formed into shaped pieces having a uniform small dimension or diameter, as by extrusion, as described more in detail in the copending application of Johnson and Bauman Serial No. 479,370, filed March 16, 1943, now abandoned, continuation-in-part Serial No. 20,357, filed April 10, 1948, now U. S. Letters Patent 2,541,068, issued February 13, 1951. The extrusions may, for example, be about ½ inch in diameter and about 1½ to 2½ inches in length. The carbonaceous material, in one or more of the forms mentioned, and in substantially stoichiometric parts as indicated, may be added before the ore is converted, or it may be added after the converted material has cooled. The material is then placed in a roasting furnace of one of the types described, and calcined to convert the ferric sulfate to iron oxide.

In my calcining steps I have employed a rotary kiln 60 feet long having an inside diameter of the kiln shell of 6 feet and an inside diameter of the kiln (inside of the kiln blocks) of 4 feet 9 inches. The pitch of the kiln was set at ⅜ of an inch per foot. At one end of the kiln (the higher end) provision is made for the introduction of a charge of pellets or extrusions of a mixture of iron sulfate and carbon, and at the same end provision is made for withdrawing gases from the kiln through a closed system. At the other end of the kiln, i. e., the discharge end of the kiln, provision is made for discharging the calcined sinter, that is, the pigment product, and at the same end of the kiln a fuel oil burner is mounted for the direct firing of the kiln. The fuel oil burner employed in the operation is a gun type, low pressure atomizing type of burner, such as the 6 inch burner designed for use with heavy fuel oil as made by North American Manufacturing Company, Cleveland, Ohio.

Particles or extrusions comprising a mixture of iron sulfate and carbon are first passed through a rotary drier where they are heated to about 200 or 300° F., so as to eliminate much of the moisture and to yield a sensibly dry material. These dried particles or extrusions (for example about ½ inch in diameter and 1 to 2 inches in length) are fed directly into the rotary kiln at the rate of 5400 pounds per hour. The kiln is rotated at 1 R. P. M. The kiln is heated by supplying to the burner, above mentioned, 60 gallons per hour of heavy fuel oil, such as "Bunker C" fuel oil. The flame of the oil burner is directed longitudinally into the kiln. A separate door or damper is also provided at the discharge end of the kiln to regulate the addition of secondary air. About 3,000 to 4,000 cubic feet per minute of gases (measured at about atmospheric pressure and about 90° F.) is withdrawn from the opposite end of the kiln. The sinter or calcined product is discharged continuously from the discharge end of the kiln, at the rate of 1800 pounds per hour, and the discharge temperature of the calcined product is about 1350° to 1800° F. The exact discharge temperature of the product is held constant when the desired shade is produced. However at different times, due to varying calcining conditions, the discharge temperatures may differ even though the same shade of color is being made, usually about 1600° to 1800° F.

The time of passage of the extrusions through the kiln is about 30–40 minutes. The product from the kiln is customarily ground to reduce agglomeration of pigment particles. The product is a red iron oxide pigment.

Let us assume that, because of slight variations within the specific conditions named, the pigment product, although burned sufficiently neutral, e. g. to within an acidity of about 1 percent, is not as orange-red in hue as is desired. By cutting down the rate at which fuel oil is supplied to the burner, the product will be changed to a more orange red shade. If the rate of feed of the fuel oil is cut down too far, keeping the other conditions constant, then the result will be that the sinter leaving the kiln will not be burned neutral; so there is a practical limit on how far the shade of the product can be controlled by simply controlling the heat input to the kiln. If the product emerging from the discharge end of the kiln is the desired shade of color, but is still acidic, i. e. is not burned substantially neutral, then by reducing the rate of rotation of the kiln and/or reducing the rate at which iron sulfate particles are fed to the kiln, with some further possible decrease in the rate the fuel oil is fed, the calcined product leaving the kiln can be brought to substantial neutrality, while still maintaining the color of the product at the desired shade.

In order to have an efficient operation and efficient use of equipment, it is desirable to have passing through the kiln as deep a bed of pellets or particles as will be uniformly calcined. If the bed is too deep, it is apparent to the operator that uniformity of color of product is not being secured; that is, a layer of the crushed calcined extrusions will give a mottled effect. On the other hand, if a very shallow depth of pellets or extrusions are passing through the kiln, it is self-evident that the pounds per hour of production will be low for the equipment employed. The foregoing specific example involves a depth of particles in the kiln which is in the preferred range.

As set out hereinabove, it is desired to have the carbon in the iron sulfate charge present in stoichiometric proportions based on the sulfate content of the iron sulfate, in accordance with the chemical equations shown hereinabove. However in practical operation, where a slurry of iron ore and carbon (such as powdered petroleum coke) is being brought into contact with sulfuric acid at one end of a reactor and then passed therethrough and the iron sulfate product then formed into extrusions, one can ordinarily only approximate exact stoichiometric proportions. The control of the proportion of carbon should nonetheless never deviate more than 8 percent, or so, from the stoichiometric proportion and it is highly desirable, and normally quite feasible to control it within about 5 or 6 percent of the exact stoichiometric proportion, or even closer, and approximations to within 2 or 3 percent of the exact stoichiometric proportion can be ordinarily had if close controls are maintained.

The heat input requirements in carrying out my calcining step will vary with the different types of roasting furnaces commonly employed, the amount of and proportions of iron sulfate in the sinter, and the shade desired in the pigment. However, for any desired pigment shade, it has been found that my improved method materially increases the calcining rate, often to the extent of 100 percent or more, and thus affords a substantial economy in operation.

The fine control of the color of the pigment product is governed by the temperature of calcination, since higher temperatures will give a bluish cast to the red iron oxide. I am able by practicing my improved calcining method, when desired, to produce red iron oxide pigments having a bluish cast and which also possess high tinting strength. This is quite an important advantage since, due to the relatively high calcining temperatures required to produce a bluish cast, it has heretofore been exceedingly difficult, if not impossible, to obtain high tinting strength in such pigments.

By carrying on the calcination in accordance with my invention as hereinabove described and illustrated, I secure much higher production rates than were attained in prior commercial methods, and still the iron sulfate is substantially completely decomposed to ferric oxide in a substantially neutral sinter, overburning of the iron oxide as it is produced during calcination is avoided, and a high quality red iron oxide pigment, having a high tinting strength and a mass tone of high chroma, is obtained. The ease of production of iron oxide pigments having light red or orange shades, as is readily possible in practicing my improvement, is one of its important advantages, since it is very difficult to produce orange shades (calcining to a neutral sinter) in the calcining methods of the art due to their inherent tendency to overburn the iron oxide at the temperatures and times necessary to substantially decompose the iron sulfate. Furthermore, as previously mentioned, it has been found that the percentage of sulphur trioxide given off during the roasting, in practicing the While my invention has been described and illustrated hereinabove in considerable detail, it will be understood that the same is done by way of illustration and not by way of limitation. All embodiments and variations comprehended by the disclosure and defined in the claims, which are novel over the prior art, are comprehended.

What I claim is:

1. The method of producing a red iron oxide pigment of good tinting strength which comprises heating a material composed mainly of a uniform mixture of iron sulfate and carbon, the carbon being controlled in amount so that it is present in an amount within the range of from about 8% less than, to about 8% more than, stoichiometric proportion with respect to the $SO_3$ content of the iron sulfate, in accordance with the equation: $2SO_3+C \rightarrow 2SO_2+CO_2$; said heating being carried on at a calcining temperature to convert said iron sulfate to $Fe_2O_3$; the carbon in the proportions specified serving to provide uniform heating throughout the iron sulfate and a reduction in the period of time required to calcine the iron sulfate.

2. The method of producing substantially sulfate-free and neutral red iron oxide pigments, comprising incorporating finely divided carbonaceous material into a raw material consisting predominantly of iron sulfate and calcining the resulting mixture to decompose the iron sulfate and form iron oxide without overburning, said carbon being incorporated in an amount within the range of from about 8% less than, to about 8% more than, the stoichiometric amount required to reduce to sulfur dioxide the sulfur trioxide resulting from the decomposition of the iron sulfate, in accordance with the equation $2SO_3+C=2SO_2+CO_2$.

3. The method of producing substantially sulfate-free and neutral red iron oxide pigments, comprising mixing finely divided carbonaceous material with ground iron ore, treating said iron ore with strong sulfuric acid to form ferric sulfate, and then roasting the converted material to decompose the ferric sulfate and form iron oxide, said carbon being present in an amount within the range of about 8% less than, to about 8% more than, the stoichiometric amount required to reduce to sulfur dioxide the sulfur trioxide resulting from the decomposition of the ferric sulfate, in accordance with the equation $2SO_3+C=2SO_2+CO_2$.

4. The method of producing substantially sulfate-free and neutral red iron oxide pigments, comprising: mixing ground iron ore, carbon, concentrated sulfuric acid and water, said acid being in an amount sufficient to convert upwards of 70% of the iron content of said ore to ferric sulfate, and said carbon being in an amount stoichiometrically equivalent to the sulfate content of said acid according to the equation $2SO_3+C=2SO_2+CO_2$; reacting said ore and said acid to form ferric sulfate; and then calcining the resulting mixture to form a substantially neutral sinter.

5. In the method of producing an iron oxide pigment which comprises mixing ground iron ore with concentrated sulfuric acid in an amount less than that required to convert all of the iron oxide content of the ore to ferric sulfate, but in an amount sufficient to convert at least about 70% of said iron oxide content to ferric sulfate, and reacting said iron and said acid at an elevated temperature so as to form a reaction product which is fluid at said elevated temperature and which will form a granular sensibly dry material upon cooling, and then calcining such material to convert the ferric sulfate to $Fe_2O_3$ and $SO_3$, and to form an iron oxide pigment, that improvement which consists in adding to the mixture, at some point prior to said calcining operation, an amount of carbon in finely divided form, said amount of carbon being essentially just sufficient, within the range of about 8% less than stoichiometric to about 8% more than stoichiometric, to carry out the reaction indicated by the equation $2SO_3+C=2SO_2+CO_2$, whereby to form a neutral, sulfate-free red iron oxide pigment.

GEORGE E. NOPONEN.

REFERENCES CITED

The following references are of record in the file of this patent:

UNITED STATES PATENTS

| Number | Name | Date |
|---|---|---|
| 453,137 | Ruymbeke | May 26, 1891 |
| 1,045,723 | McFetridge | Nov. 26, 1912 |
| 1,048,247 | Weeks | Dec. 24, 1912 |
| 1,472,131 | Maxham | Oct. 30, 1923 |
| 1,489,361 | Maxham | Apr. 8, 1924 |
| 2,184,738 | Fireman | Dec. 26, 1939 |
| 2,203,905 | Heckman | June 11, 1940 |
| 2,215,394 | Hechenbleikner | Sept. 17, 1940 |
| 2,242,763 | Smith | May 20, 1941 |
| 2,252,332 | Plummer | Aug. 12, 1947 |
| 2,416,138 | Ayers | Feb. 18, 1947 |

FOREIGN PATENTS

| Number | Country | Date |
|---|---|---|
| 4,201 of 1881 | Great Britain | Sept. 29, 1881 |
| 523,241 | Great Britain | July 9, 1940 |

OTHER REFERENCES

Berling, "Oxide of Iron Pigments," Can. Chem. and Met., vol. 15, January 1931, page 18, lines 9 to 25.